USO09635547B1

(12) United States Patent
Mincher et al.

(10) Patent No.: US 9,635,547 B1
(45) Date of Patent: Apr. 25, 2017

(54) SYSTEMS, DEVICES, AND METHODS FOR OBFUSCATING LOCATION

(71) Applicant: AMAZON TECHNOLOGIES, INC., Reno, NV (US)

(72) Inventors: Richard William Mincher, Cupertino, CA (US); David George Butler, San Jose, CA (US)

(73) Assignee: Amazon Technologies, Inc., Reno, NV (US)

( * ) Notice: Subject to any disclaimer, the term of this patent is extended or adjusted under 35 U.S.C. 154(b) by 285 days.

(21) Appl. No.: 14/444,590

(22) Filed: Jul. 28, 2014

(51) Int. Cl.
*H04W 12/02* (2009.01)
*H04W 4/02* (2009.01)

(52) U.S. Cl.
CPC ............ *H04W 12/02* (2013.01); *H04W 4/02* (2013.01)

(58) Field of Classification Search
CPC .... H04L 12/4604; H04W 84/04; H04W 88/06
See application file for complete search history.

(56) References Cited

U.S. PATENT DOCUMENTS

| | | | | |
|---|---|---|---|---|
| 8,655,389 | B1* | 2/2014 | Jackson | G01S 19/39 455/414.1 |
| 2004/0123153 | A1* | 6/2004 | Wright | G06F 21/32 726/1 |
| 2007/0264974 | A1* | 11/2007 | Frank | H04L 63/0407 455/411 |
| 2012/0328101 | A1* | 12/2012 | Lakshminarayanan | H04L 63/0823 380/258 |
| 2013/0275268 | A1* | 10/2013 | Wright | G06Q 30/02 705/26.61 |
| 2014/0169358 | A1* | 6/2014 | Krasniqi | H04W 4/12 370/338 |
| 2014/0337950 | A1* | 11/2014 | Yang | H04W 12/08 726/7 |
| 2015/0067880 | A1* | 3/2015 | Ward | G06F 21/6245 726/26 |
| 2015/0195710 | A1* | 7/2015 | Bar-Niv | H04W 12/08 726/23 |
| 2015/0304920 | A1* | 10/2015 | Cootey | H04W 28/18 455/436 |
| 2015/0350890 | A1* | 12/2015 | Arunkumar | H04W 12/02 455/411 |

* cited by examiner

*Primary Examiner* — Charles C Jiang
*Assistant Examiner* — Kyaw Z Soe
(74) *Attorney, Agent, or Firm* — Lindauer Law, PLLC

(57) ABSTRACT

Described are techniques and systems for obfuscating a location of a computing device as determined using data acquired from wireless devices within communication range of the computing device. The computing device may be configured to generate report data that includes synthetic data which is representative of data of a different location than the actual location of the computing device. As a result, when the report data is analyzed, the computing device appears to be present at an apparent location which differs from the actual location.

20 Claims, 8 Drawing Sheets

SYSTEMS, DEVICES, AND METHODS FOR OBFUSCATING LOCATION

BACKGROUND

Services may determine locations of computing devices such as mobile devices. For example, the services may determine locations by analyzing service set identifiers ("SSIDs") that are acquired by the computing devices from other computing devices operating in an access point mode. Users of the computing devices or service providers of the computing devices may not wish for certain services to be able to determine the actual locations of the computing devices.

Figure 1:
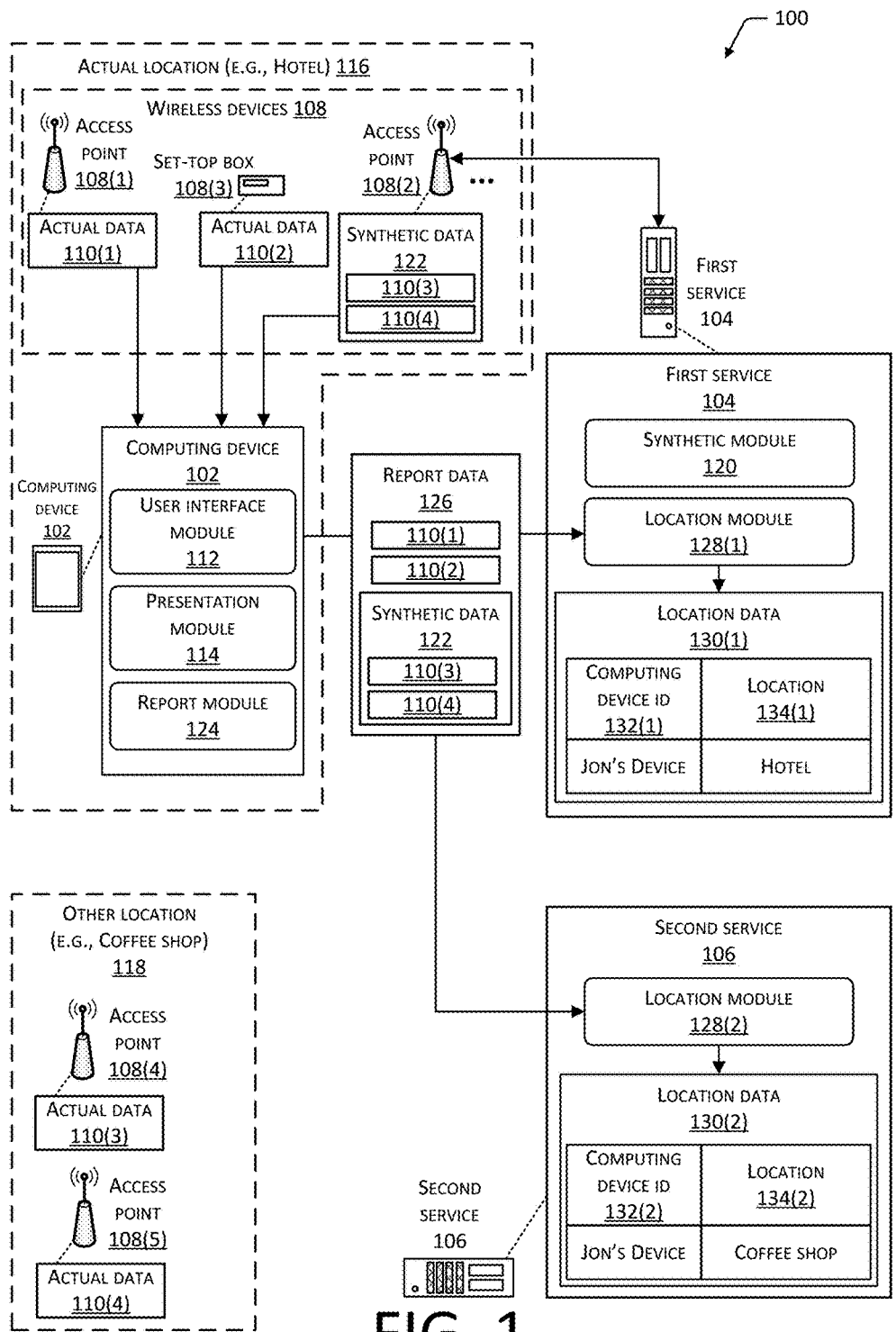
FIG. 1 is an illustrative system for obfuscating a location of one or more computing devices.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

Services may determine the location of a computing device (e.g., a mobile device or a stationary device). A service may include one or more servers. The location of the computing device may include geolocation data such as latitude and longitude of the computing device, a street address, room designation (e.g., kitchen, banquet hall room A), and so forth. The computing device may include at least one of a smartphone, a tablet computer, a laptop computer, a wearable computing device, an electronic book ("eBook") reader, an in-vehicle communication system, a desktop computer, a television, a gaming console, a server, and so forth.

The service may use a database for looking up the location of the computing device based on information provided by the computing device. In one example, the information provided by the client device includes a list identifying detected wireless networks. The service may determine a location of the client by looking up a location that is associated with the received list. However, users of the computing device or a service provider of the computing device may not wish for certain services to be able to determine the actual locations of the computing device.

This disclosure describes systems, devices, and methods for obfuscating locations of the computing device. In one example, the location of the computing device is obfuscated when the service is unable to determine a true or actual location of the computing device. In another example, the location of the computing device is obfuscated when the service determines that the computing device is located at a location other than the actual location of the computing device.

In some implementations, the location is obfuscated based on synthetic data. The synthetic data may represent information transmitting from devices that are located at locations other than the actual location of the computing device. In one example, the information transmitting from the devices includes information representative of the device transmitting the information. The synthetic data may include identification information such as a SSID. The SSID may include a string. For example, a Wi-Fi™ compliant SSID may be 1 to 32 bytes in length. In another example, the synthetic data may include identification information such as a basic service set identification ("BSSID"). The BSSID may be described as unique information that identifies a network hub for connecting multiple network devices. For example, the BSSID may comprise a media access control ("MAC") address.

The computing device may be configured to generate report data that is provided to one or more services for analysis. The one or more services analyze the report data to determine (or attempt to determine) the location of the computing device, actual or obfuscated. The report data may comprise information about at least one of wireless devices or wireless networks that were detected by the computing device. For example, at a particular location (e.g., a coffee shop), the computing device may detect different identification data that is being transmitted from different wireless devices located at the particular location. The computing device may acquire this different identification information from these different wireless devices. The identification being transmitted from the wireless devices may include the synthetic data. The identification data that is associated with the wireless devices may comprise actual data. The computing device may generate the report data by aggregating the detected actual data and the detected synthetic data.

The computing device may provide the report data to the service. The service may analyze the report data to determine (or attempt to determine) the actual locations of the computing device. In one example, the report data comprises a list of detected identification information including first actual data, second actual data, and synthetic data. In an attempt to determine the actual location of the computing device, the service may compare the list with a data store that stores a plurality of different lists associated with locations. In this example, the service is unable to determine the actual location of the computing device because the service analyzes the synthetic data and determines that the computing device is located at a location other than the actual location.

In some implementations, the synthetic data is configured to change over time. For example, a wireless device may be configured to periodically change the synthetic data that is transmitted by the wireless device every 60 seconds. By changing the synthetic data, the service may incur difficulty creating a data store with consistent information that needed for a reliable location determination system. For example, at a first time, for a first location, the service may acquire first report data from the computing device. The report data may include a first list of information acquired by the computing device, and the first list may include first synthetic data. The service may associate the first list with the first location. However, at a second time, the service may acquire second report data that was acquired by another computing device at the first location. In this example, the second report data includes a second list that includes second synthetic data that is different from the first synthetic data. Difficulty occurs in creating an accurate location data store because the association of the first list and the second list with the first location provides inconsistent results.

In some implementations, a first service may be configured differently from a second service such that the first service may determine the actual location of the computing device, and the second service may not determine the actual location of the computing device. For example, the first service may have a predetermined relationship with a user such that the user wishes for the first service to be able to determine the actual locations of the computing device of the user, while keeping the second service from knowing the actual locations of the computing device.

In one example, a first service is configured to determine the actual location of the computing device, and a second service is configured to determine the computing device is located at a location other than the actual location of the computing device. The first service may be configured to generate the synthetic data and provide the synthetic data to the wireless devices that, in turn, transmits the synthetic data to the computing device. Because the first service stores the synthetic data, the first service may remove the synthetic data and analyze the actual data of the report data that is provided to the first service.

In another example, because the first service knows which portion of the report data includes the synthetic data, the first service may build a location data store that is more accurate when compared to the second service. When the second service analyzes the report data, the second service either determines that the computing device is located at an inaccurate location, or the second service is unable to determine a location for the computing device. On the other hand, the first service is able to analyze the report data to determine the actual locations of the computing device. In some implementations, the first service may use the synthetic data as a non-repudiation factor to authenticate the computing device. For example, first service may generate the synthetic data and provide the synthetic data to a wireless device known to be located at a particular coffee shop. The computing device may be located at the coffee shop, and the computing device may acquire the synthetic data. Once the computing device generates and provides the report data, which includes the synthetic data, to the first service, the first service may confirm that the computing device was located at the coffee shop.

By providing report data indicative of identification information of devices located at locations other than the actual location of the computing device, the location of the computing device may be obfuscated. For example, a service may determine that the computing device is located at a coffee shop when the computing device is actually located at home.

In addition, certain designated services may be configured to determine the actual location of the computing device while other services may not be configured to determine the actual location of the computing device. As discussed above, designated services may participate in the generation of the synthetic data such that when the designated services analyze the report data, the designated services know which data is the synthetic data and which data is the actual data. As a result, the designated services may accurately determine the actual location of the computing device.

Illustrative System

FIG. 1 illustrates a system 100 for obfuscating a location of one or more computing devices. The location may include geolocation data such as latitude and longitude of the computing devices, a street address, room designation (e.g., kitchen, banquet hall room A), and so forth. A computing device 102 is depicted in communication with a first service 104 and a second service 106.

The computing device 102 may include at least one of a smartphone, a tablet computer, a laptop computer, a wearable computing device, an electronic book ("eBook") reader, an in-vehicle communication system, a desktop computer, a television, a gaming console, a server, and so forth. The computing device 102 is discussed in more detail below with regard to FIG. 2.

The first service 104 may comprise one or more servers that are configured to determine locations of the computing devices 102. The first service 104 may be predetermined to be trusted. In some implementations, the first service 104 may comprise a set of set of instructions that execute on one or more server to perform one or more computational tasks such as determining locations of computing devices 102. As discussed in more detail below with regard to FIG. 3, the first service 104 may determine a location of the computing device 102 by comparing data acquired from the computing device 102 with a database that associates the acquired data with locations.

The second service 106 may comprise one or more servers that are configured to determine locations of the computing devices 102. The second service 106 may be predetermined to be untrusted. The computing device 102 may determine that a particular service is untrusted in response to a determination that identification information associated with the particular service does not include designated identification information. In some implementations, the second service 106 may comprise a set of instructions that execute on one or more servers to perform one or more computational tasks such as determining locations of computing devices 102.

The system 100 may include one or more wireless devices 108. A wireless device 108 may comprise a computing device that enables other computing devices (e.g., the computing device 102) to wirelessly connect to the wireless device 108, using wireless communication standards such as Wi-Fi®, Bluetooth®, ZigBee®, and so forth. The wireless device 108 may be configured to operate in an access point mode. In access point mode, the wireless device 108 may allow the computing device 102 to connect to a wired network. In FIG. 1, the wireless devices 108 include access point 108(1), access point 108(2), and set-top box 108(3). In some implementations, the wireless device 108 may comprise another computing device 102.

The computing device 102, the first service 104, the second service 106, and the wireless devices 108 may be in communication with one another using one or more networks (not shown). The one or more networks may include one or more public networks such as the Internet, private networks, or a combination of both. The network facilitating communication between the computing device 102, the first service 104, the second service 106, and the wireless devices 108 may include a variety of networks, such as a local network, a wide area network ("WAN"), broadcast network, a personal area network ("PAN"), a wired and wireless local area network ("LAN"), and so forth. In some implementations, the network includes at least one of Ethernet, Wi-Fi® as promulgated by the Wi-Fi Alliance, 3G and 4G, Bluetooth® as promulgated by the Bluetooth® Special Interest Group, and so forth. In some implementations, the devices and systems described herein are configured to directly connect to each other.

A wireless device 108 may include actual data 110 that comprises information associated with the wireless device 108. In one example, the actual data 110 includes identification information. The identification information may include a SSID. The SSID may include a human-readable 1 to 32 byte string. The SSID may be modified by an administrative user of the wireless device 108. As described in more detail below, at least one of the first service 104 or the second service 106 may use one or more SSIDs to determine (or attempt to determine) the location of the computing device 102.

In another example, the actual data 110 may include a BSSID. The BSSID may be described as unique information that identifies a network hub for connecting multiple network devices. In yet another example, the actual data 110 may include a MAC address. The MAC address may be described as unique information representative of hardware of a wireless device 108. The BSSID or MAC address may be expressed using characters such as letters, numbers, symbols, and so forth. The MAC address may identify the manufacturer of the computing device 102. When compared to the SSID, typically the MAC address may be considered more unique. As described in more detail below, at least one of the first service 104 or the second service 106 may use at least one of the BSSID or the MAC address to determine (or attempt to determine) the location of the computing device 102.

The computing device 102 may include a user interface module 112. The user interface module 112 may be configured to provide a user interface to the user of the computing device 102. In one implementation, the user interface may be a web interface presented via the network and accessible to the user. In another implementation, the user interface may comprise an application programming interface ("API") that enables communication such as sending requests for data from the first service 104 to the computing device 102. The user interface may be configured to allow the user to logon to the computing device 102 by inputting credentials.

The computing device 102 may include a presentation module 114 configured to present information using output devices of the computing device 102. For example, the presentation may include displaying the information using a display device of the computing device 102 or producing audio using speakers of the computing device 102.

The computing device 102 may be configured to detect the presence of the wireless devices 108. Detecting the presence of the wireless devices 108 may include acquiring the actual data 110 of the wireless devices 108. In one example, the computing device 102 detects the presence of wireless devices 108 that are located in the same location as the computing device 102. In FIG. 1, the computing device 102 and the wireless devices 108 are located at the same location —the actual location 116 (e.g., hotel). The computing device 102 detects the presence of the access points 108(1) and 108(2) and the set-top box 108(3). The computing device 102 may detect the presence of wireless devices 108 using at least one of active scanning or passive scanning. Active scanning may include sending multiple probe requests and recording probe responses. Passive scanning may include acquiring information once data is transmitted by an access point.

The computing device 102 may be configured to detect the presence of the wireless devices 108 that are proximate to the computing device 102. For example, in FIG. 1, at the actual location 116, the computing device 102 is proximate to the wireless devices 108 because the computing device 102 and the wireless devices 108 are located within a designated distance of one another. The designated distance may be limited by a distance based on the computing device's 102 capabilities. For example, the actual location 116 may have a circular shaped boundary based on the computing device 102 having a capability of acquiring information within 35 meters.

In FIG. 1, the access points 108(4) and 108(5) are located at the other location 118 (e.g., Coffee shop). The access points 108(4) and 108(5) are not proximate to the computing device 102 because the wireless devices 108 are not located at the actual location 116. Accordingly, the computing device 102 is unable to acquire the actual data 110(3) and 110(4) from the access points 108(4) and 108(5), respectively.

The actual location 116 may include any suitable location, such as a portion of space within a building or other structure. The actual location 116 may or may not be separated by walls or partitions from other parts of the actual location 116. The other location 118 may include any suitable location, such as a portion of space within a building or other structure. The other location 118 may or may not be separated by walls or partitions from other parts of the other location 118.

The first service 104 may include a synthetic module 120 configured to generate synthetic data 122. The synthetic data 122 may comprise information that causes the location of the computing device 102 to be obfuscated. For example, the synthetic data 122 may include data indicative of locations other than the actual location 116 of the computing device 102. In FIG. 1, the synthetic module 120 generates synthetic data 122 such that the synthetic data 122 includes actual data 110 that is associated with wireless devices 108 located at the other location 118 and not the actual location 116. That is, the synthetic data 122 includes the actual data 110(3) and 110(4) associated with the access points 108(4) and 108(5), respectively, which are not located at the actual location 116. The synthetic data 122 may include identification information such as a SSID, a BSSID, a MAC address, and so forth. The synthetic data 122 may be simulated and not represent an actual location 116. That is, the synthetic data 122 may be fabricated or may represent imaginary information.

The synthetic module 120 may generate the synthetic data 122 by selecting data from a data store that includes actual data 110 associated with locations. As discussed in more detail below, in some implementations, the synthetic module 120 may generate the synthetic data 122 based on a seed value.

The first service 104 may transmit the synthetic data 122 to the access point 108(2) using the network described above. The first service 104 may be associated with one or more of the wireless devices 108. For example, a business entity may manage the first service 104 and one or more of the wireless devices 108.

The computing device 102 detects the presence of the access points 108(1) and 108(2) and the set-top box 108(3). Detecting the presence of these devices may include acquiring the actual data 110(1) from the access point 108(1), the actual data 110(2) from the set-top box 108(3), and the synthetic data 122 from the access point 108(2).

The computing device 102 may include a report module 124 configured to generate report data 126. The report data 126 may comprise information acquired from the wireless devices 108 that is used by at least one of a first service 104 or a second service 106 to determine (or attempt to determine) location information associated with the computing device 102. The report data 126 may include the actual data 110 and the synthetic data 122 that was detected or acquired by the computing device 102. In FIG. 1, the report data 126 includes the actual data 110(1) and 110(2) and the synthetic data 122 that was acquired by the computing device 102. The report data 126 may also include other information, such as a timestamp indicating when the actual data 110 or the synthetic data 122 was detected. As discussed in more detail below, the report data 126 may be used by the first service 104 as a reference for determining location.

The computing device 102 may provide the report data 126 to the first service 104 using the network described above. The computing device 102 may provide the report data 126 to the first service 104 in response to receiving a request from the first service 104 to provide the report data 126. In some implementations, the computing device 102 is configured to provide the report data 126 to the first service 104 at predetermined times. For example, the computing device 102 may provide the report data 126 to the first service 104 every minute.

The first service 104 may manage information used to determine locations of one or more computing devices 102. The first service 104 may include a location module 128(1) configured to generate location data 130(1) representative of locations of one or more computing devices 102. The first service 104 may include a location data store (not shown) configured to store a variety of information that may be used to determine the location of the computing device 102. The stored information may include information about a list of wireless network IDs and the locations associated with the list. The location module 128(1) may compare the report data 126 with the information stored in the location data store to determine the location of the computing device 102.

The location data 130(1) may include a table storing information that may be visualized by an administrator as organized in columns and rows. The location data 130(1) may include computing device identification ("ID") 132(1) associated with location 134(1). In FIG. 1, the computing device 102 has a computing device ID 132(1) of "Jon's Device". The location module 128(1) compares the report data 126 against the location data store and determines that "Jon's Device" is located at the "Hotel" which is where the computing device 102 is actually located.

The location module 128(1) may be configured to determine the actual location 116 of the computing device 102 because the first service 104 may determine which portions of the report data 126 are associated with the synthetic data 122 and which portions of the report data 126 are associated with the actual data 110. The first service 104 may filter the synthetic data 122 from the report data 126 to determine the actual data 110 of the report data 126. Once the first service 104 determines the actual data 110, the first service 104 may compare the actual data 110 with a data store that includes other actual data 110 that is associated with different locations to determine the actual location 116 of the computing device 102.

In some implementations, the first service 104 acquires information indicating the location of a wireless device 108 when the wireless device 108 transmitted the synthetic data 122 to the computing device 102. By knowing this location information and information about the synthetic data 122, the first service 104 may be configured to use the report data 126 to confirm the actual location 116 of the computing device 102.

The computing device 102 may provide the report data 126 to the second service 106 using the network described above. The computing device 102 may provide the report data 126 to the second service 106 in response to receiving a request from the second service 106 to provide the report data 126. In some implementations, the computing device 102 is configured to provide the report data 126 to the second service 106 at predetermined times. For example, the computing device 102 may provide the report data 126 to the second service 106 every minute.

The second service 106 may manage information used to determine (or attempt to determine) locations of one or more computing devices 102. The second service 106 may include a location module 128(2) configured to generate location data 130(2) representative of locations of one or more computing devices 102. The second service 106 may include a location data store (not shown) configured to store a variety of information that may be used to determine (or attempt to determine) the location of the computing device 102. The stored information may include information about a list of wireless network IDs and the locations associated with the list. The location module 128(2) may compare the report data 126 with the information stored in the location data store to determine the location of the computing device 102.

The location data 130(2) may include a table storing information that may be visualized by an administrator as organized in columns and rows. The location data 130(2) may include computing device ID 132(2) associated with location 134(2). The location module 128(2) compares the report data 126 against the location data store and determines that "Jon's Device" is located at the "Coffee Shop" which is not where the computing device 102 is actually located.

In some implementations, the wireless devices 108 may change how the synthetic data 122 is transmitted to the computing device 102. For example, the wireless device 108 may use different channels to transmit the synthetic data 122 over time. In another example, the wireless device 108 may transmit the synthetic data 122 using different power levels over time. By changing the way the synthetic data 122 is transmitted, the location of the computing device 102 may be better obfuscated when compared to systems that do not change the way the synthetic data 122 is transmitted. Services (e.g., the second service 106) may use information about channels or power levels to determine locations of the computing device 102. By changing the information about channels or power levels, the second service 106 may have difficulty determining the location of the computing device 102 because different channels or different power levels may indicate different locations.

Figure 2:
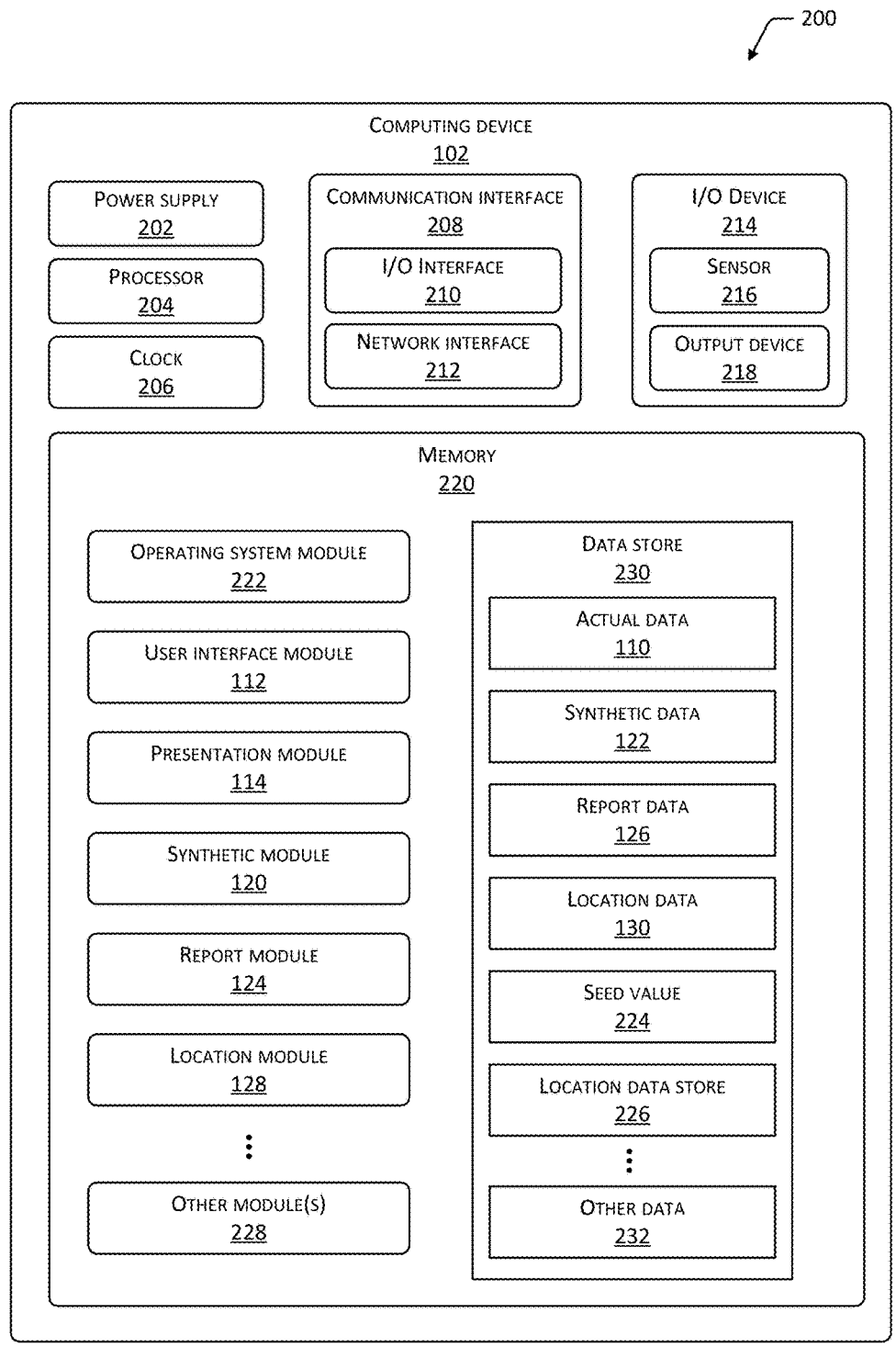
FIG. 2 is a block diagram of a computing device configured to provide synthetic data.

By providing the report data 126 that includes the synthetic data 122, the location of the computing device 102 may be obfuscated for certain services such as the second service 106. By obfuscating the location, users of the computing device 102 or service providers of the computing device 102 may prevent potentially valuable location information to outsiders. FIG. 2 is a block diagram 200 of the computing device 102 configured to provide the synthetic data 122. In some implementations, one or more wireless devices 108 may be implemented as the computing device 102. The computing device 102 may include a power supply 202 configured to provide power to various components of the computing device 102. The power supply 202 may include a portable power supply, such as a disposable or rechargeable battery or battery pack, or the power supply 202 may include a wired power supply, such as an alternating current ("AC") power supply configured to be plugged into an electrical outlet.

The computing device 102 may include at least one hardware processor 204 (or "processor") configured to execute stored instructions. The at least one hardware processor 204 may comprise one or more cores.

The computing device 102 may include a clock 206 such as a circuit that produces a timing signal (or clock signal) used to synchronize operations of the computing device 102. The clock 206 may include a resonant circuit (e.g., a quartz piezo-electric oscillator) and amplifier.

The computing device 102 may include one or more communication interfaces 208. The communications interface 208 may include one or more input/output ("I/O") interfaces 210 that enables portions of the computing device 102 (e.g., the hardware processor 204) to communicate with other devices. The I/O interface 210 may be configured to implement various protocols, such as inter-integrated circuit ("I2C"), serial peripheral interface bus ("SPI"), Universal Serial Bus ("USB"), RS-232, HDMI, TOSLINK®, Bluetooth®, and so forth.

The communications interface 208 may include one or more network interfaces 212. The network interface 212 is configured to provide communications with other computing devices 102, the first service 104, the second service 106, web-based resources, servers, routers, wireless access points, network access satellites, cellular towers, and so forth. The network interface 212 may include wireless functions, devices configured to couple to one or more networks including LANs, wireless LANs, WANs, wireless WANs, and so forth. The computing devices 102 may also include one or more busses or other internal communications hardware or software that allow for the transfer of data between the various modules and components of the computing devices 102.

The I/O interface 210 may couple to one or more I/O devices 214. The I/O devices 214 may include one or more input devices such as a keyboard, a mouse, a microphone, a digital camera, user input buttons, and so forth.

The I/O device 214 may include one or more sensors 216 that may comprise one or more devices that detects or measures certain properties. The sensor 216 may record, indicate, or otherwise respond to the detection of a certain property. In one example, the sensor 216 includes at least one of an accelerometer or a gyroscope that is configured to generate movement data representing movement of the computing device 102. In another example, the sensor 216 may include a magnetometer configured to measure the strength and the direction of magnetic fields. In some implementations, the computing device 102 uses the magnetometer as a compass that indicates direction in a frame of reference that is stationary to the surface of Earth. In yet another example, the sensor 216 may include a proximity sensor configured to generate presence data indicative of a presence of an object proximate to the computing device 102. For example, the proximity sensor may detect another computing device 102, a wireless device 108, and so forth. The proximity sensor may include optical proximity sensors, capacitive proximity sensors, acoustic proximity sensors, near field communication ("NFC") tag readers, radio frequency identification ("RFID") tag readers, and so forth. For example, the RFID tag readers may generate proximity data based on detection and strength of a radio signal received from an RFID tag. The proximity sensors may generate the presence data by using remote sensing technologies such as lidar, radar, sonar, and so forth. In yet another example, the sensor 216 may include a location sensor configured to generate information about the location of the computing device 102. The location information may include geolocation data which is indicative of a latitude and longitude of the computing device 102. The location sensor may also determine the location of the computing device 102 using an inertial navigation system, dead-reckoning navigation system, network positioning system, radio position finding system, satellite-based navigation system, an accelerometer system, a gyroscope system, and so forth. The satellite-based navigation system may include one or more of a Global Positioning System ("GPS") receiver, a global navigation satellite system ("GLONASS") receiver, a Galileo receiver, an Indian Regional Navigational Satellite System, and so forth.

The I/O devices 214 may also include output devices 218 such as one or more displays, audio speakers, haptic output devices, and so forth. The I/O devices 214 may also include respective navigational resources such as, without limitation, satellite-based navigation or positioning systems such as GPS or GLONASS receivers, cellular tower-based locating, inertial navigation devices or systems, radio-based navigation receivers, dead-reckoning devices, gyroscopes, odometers, compasses, accelerometers, and so on. In some embodiments, the I/O devices 214 may be physically incorporated within the computing device 102, or the I/O devices 214 may be externally placed. The I/O devices 214 may include various other devices as well.

As illustrated in FIG. 2, the computing device 102 may include at least one memory 220 or memory device. The memory 220 may include at least one non-transitory computer-readable storage media ("CRSM"). The CRSM may include at least one of an electronic storage medium, a magnetic storage medium, an optical storage medium, a quantum storage medium, or a mechanical computer storage medium. The memory 220 may include computer readable instructions, data structures, program modules, and other data for the operation of the computing device 102.

The memory 220 may include at least one operating system ("OS") module 222. The OS module 222 may be configured to manage hardware resources such as the I/O interface 210, the communication interface 208, the I/O devices 214, and provide various services to applications or modules executing on the hardware processor 204. The memory 220 may also store at least one of the following modules that may be executed as foreground applications, background tasks, daemons, and so forth.

The memory 220 may include the user interface module 112 configured to provide a user interface to a user or to the computing device 102. In one implementation, the user interface may be a web interface presented via the network and accessible to the user. In another implementation, the user interface may comprise an API that enables communication such as sending requests for items from the first service 104 to the computing device 102. The user interface may be presented using one or more output devices 218, such as a display on a display device, sound from a speaker, and so forth.

The memory 220 may include the presentation module 114 configured to present information using output devices of the computing device 102. For example, the presentation may include displaying the information using a display device of the computing device 102 or producing audio using speakers of the computing device 102.

The memory 220 may include the synthetic module 120 configured to generate the synthetic data 122. In some implementations, the first service 104 includes a first synthetic module 120 that generate first synthetic data 122, and the computing device 102 includes a second synthetic module 120 configured to generate second synthetic data 122. In these implementations, the report module 124 may generate the report data 126 such that the report data 126 includes the first synthetic data 122 and the second synthetic data 122. The computing device 102 may provide data identifying the second synthetic data 122 to the first service 104 such that the first service 104 may determine the actual location 116 of the computing device 102.

In some implementations, the synthetic module 120 generates the synthetic data 122 based on a pseudorandom generation. For example, the synthetic module 120 may operate as a pseudorandom number generator that generates one or more random numbers. The pseudorandom number that is generated may comprise the synthetic data 122. The pseudorandom number may be expressed using characters such as letters, numbers, symbols, and so forth. A particular pseudorandom number may represent a BSSID for a wireless device 108. The synthetic module 120 may generate the pseudorandom number using a seed value 224 as an input. The seed value 224 may be used to initialize a pseudorandom number generator.

The memory 220 may include the report module 124 configured to generate the report data 126. The report module 124 may generate the report data 126 by aggregating the actual data 110 and the synthetic data 122 that was acquired at a particular location. For example, at a grocery store, the computing device 102 may obtain a plurality of BSSIDs from different wireless devices 108. The report module 124 may aggregate these BSSIDs into report data 126, and the report module 124 may provide the report data 126 to one or more services (e.g., the first service 104 or the second service 106).

The memory 220 may include the location module 128 configured to generate the location data 130. The location module 128 may be configured to query a location data store 226 storing a variety of information that may be used to determine the location of the computing device 102. The stored information may include information about a list of wireless network IDs and the locations associated with the list. The location module 128 may compare the report data 126 with the information stored in the location data store 226 to determine the location of the computing device 102. Where the computing device 102 includes the location module 128, the computing device 102 may provide the location data 130 to at least one of the first service 104 or the second service 106. In another example, the computing device 102 includes one or more applications or processes comprising one or more sets of instructions that execute on the computing device 102 to perform one or more computational tasks. The location module 128 may be configured to provide the location data 130 to these applications or services that are being executed by the computing device 102.

The memory 220 may include one or more other modules 228. For example, a module may be configured to manage administrative preferences, account information, and so forth.

The location obfuscation techniques described above involve wirelessly communicating the actual data 110 and the synthetic data 122. In some implementations, the location obfuscation techniques may be used on a wired network. For example, the computing device 102 may connect to a wired Ethernet network and receive data packets of the synthetic data 122. The computing device 102 may generate the report data 126 and provide the report data 126 to one or more of the first service 104 or the second service 106 using the wired Ethernet network.

In some implementations, the memory 220 includes a data store 230 for storing information. The data store 230 may use a flat file, database, linked list, tree, or other data structure to store the information. In some implementations, the data store 230, or a portion thereof, may be distributed across at least one other device, such as a server, a network storage device, and so forth. As illustrated in FIG. 2, the data store 230 may include at least one of the actual data 110, the synthetic data 122, the report data 126, the location data 130, the seed value 224, the location data store 226, or other data 232. The other data 232 may include information such as administrator preferences, account information associated with users, and so forth.

Figure 3:
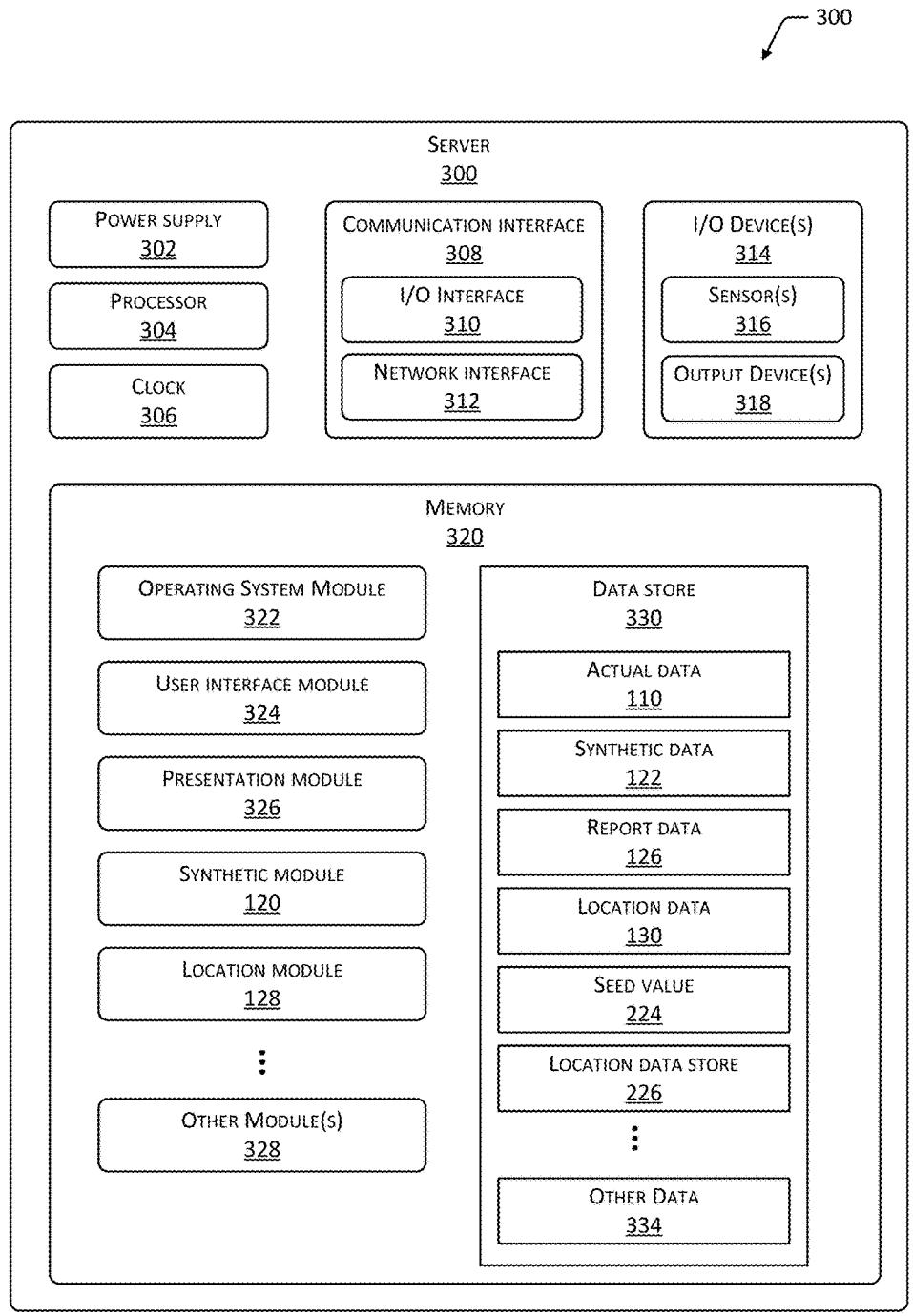
FIG. 3 is a block diagram of a server configured to determine locations of computing devices.

FIG. 3 is a block diagram of a server 300 configured to determine locations of computing devices 102. The server 300 may comprise at least one of the first service 104 or the second service 106. The server 300 may include a power supply 302 configured to provide power to various components of the server 300. The power supply 302 may include a portable power supply, such as a disposable or rechargeable battery or battery pack, or the power supply 302 may include a wired power supply, such as an AC power supply configured to be plugged into an electrical outlet.

The server 300 may include at least one hardware processor 304 (or "processor") configured to execute stored instructions. The at least one hardware processor 304 may comprise one or more cores.

The server 300 may include a clock 306 such as a circuit that produces a timing signal (or clock signal) used to synchronize operations of the server 300. The clock 306 may include a resonant circuit (e.g., a quartz piezo-electric oscillator) and amplifier.

The server 300 may include one or more communication interfaces 308. The communications interface 308 may include one or more I/O interfaces 310 that enables portions of the server 300 (e.g., the hardware processor 304) to communicate with other devices. The I/O interface 310 may be configured to implement various protocols, such as I2C, SPI, USB, RS-232, HDMI, TOSLINK®, Bluetooth®, and so forth.

The communications interface 308 may include one or more network interfaces 312. The network interface 312 is configured to provide communications with the computing device 102, other servers 300, web-based resources, routers, wireless access points, network access satellites, cellular towers, and so forth. The network interface 312 may include wireless functions, devices configured to couple to one or more networks including LANs, wireless LANs, WANs, wireless WANs, and so forth. The server 300 may also include one or more busses or other internal communications hardware or software that allow for the transfer of data between the various modules and components of the server 300.

The I/O interface 310 may couple to one or more I/O devices 314. The I/O devices 314 may include one or more input devices such as a keyboard, a mouse, a microphone, a digital camera, user input buttons, and so forth.

The I/O device 314 may include one or more sensors 316 that may comprise one or more devices that detects or measures certain properties. The sensor 316 may record, indicate, or otherwise respond to the detection of certain properties. In one example, the sensor 316 may include at least one of an accelerometer, a gyroscope, a magnetometer, a proximity sensor, or a location sensor.

The I/O devices 314 may also include output devices 318 such as one or more displays, audio speakers, haptic output devices, and so forth. The I/O devices 314 may also include respective navigational resources such as, without limitation, satellite-based navigation or positioning systems such as GPS or GLONASS receivers, cellular tower-based locating, inertial navigation devices or systems, radio-based navigation receivers, dead-reckoning devices, gyroscopes, odometers, compasses, accelerometers, and so on. In some embodiments, the I/O devices 314 may be physically incorporated within the server 300, or the I/O devices 314 may be externally placed. The I/O devices 314 may include various other devices as well.

As illustrated in FIG. 3, the server 300 may include at least one memory 320 or memory device. The memory 320 may include at least one non-transitory CRSM. The CRSM may include at least one of an electronic storage medium, a magnetic storage medium, an optical storage medium, a quantum storage medium, or a mechanical computer storage medium. The memory 320 may include computer readable instructions, data structures, program modules, and other data for the operation of the server 300.

The memory 320 may include at least one OS module 322. The OS module 322 may be configured to manage hardware resources such as the I/O interface 310, the communication interface 308, I/O devices 314, and provide various services to applications or modules executing on the hardware processor 304. The memory 320 may also store at least one of the following modules that may be executed as foreground applications, background tasks, daemons, and so forth.

The memory 320 may include a user interface module 324 configured to provide a user interface to a user or to the server 300. In one implementation, the user interface may be a web interface presented via the network and accessible to the user. In another implementation, the user interface may comprise an API that enables communication such as sending requests for items from the computing device 102 to the server 300. The user interface may be presented using one or more output devices 318, such as a display on a display device, sound from a speaker, and so forth.

The memory 320 may include a presentation module 326 configured to present information using output devices of the server 300. For example, the presentation may include displaying the information using a display device of the server 300 or producing audio using speakers of the server 300.

The memory 320 may include the synthetic module 120 configured to generate the synthetic data 122. The synthetic module 120 may generate the synthetic data 122 by selecting data from a data store that includes actual data 110 associated with locations. The synthetic module 120 may generate the synthetic data 122 based on the seed value 224. Although the server 300 depicted in FIG. 3 includes the synthetic module 120, in some implementations, the server 300 does not include the synthetic module 120 such as the second service 106 depicted in FIG. 1.

The memory 320 may include the location module 128 configured to generate the location data 130 representative of locations of one or more computing devices 102.

The memory 320 may include one or more other modules 328. For example, a module may be configured to manage administrative preferences, account information, and so forth.

In some implementations, the memory 320 includes a data store 330 for storing information. The data store 330 may use a flat file, database, linked list, tree, or other data structure to store the information. In some implementations, the data store 330, or a portion thereof, may be distributed across at least one other device, such as another server 300, a network storage device, and so forth. As illustrated in FIG. 3, the data store 330 may include at least one of the actual data 110, the synthetic data 122, the report data 126, the location data 130, the seed value 224, the location data store 226, or other data 334. The other data 334 includes information such as administrator preferences, account information associated with users, and so forth.

The location data store 226 may store a variety of information that may be used to determine the location of the computing device 102. In one example, the stored information may include data representing lists of wireless device 108 BSSIDs and SSIDs and the locations that are associated with the lists.

Figure 4:
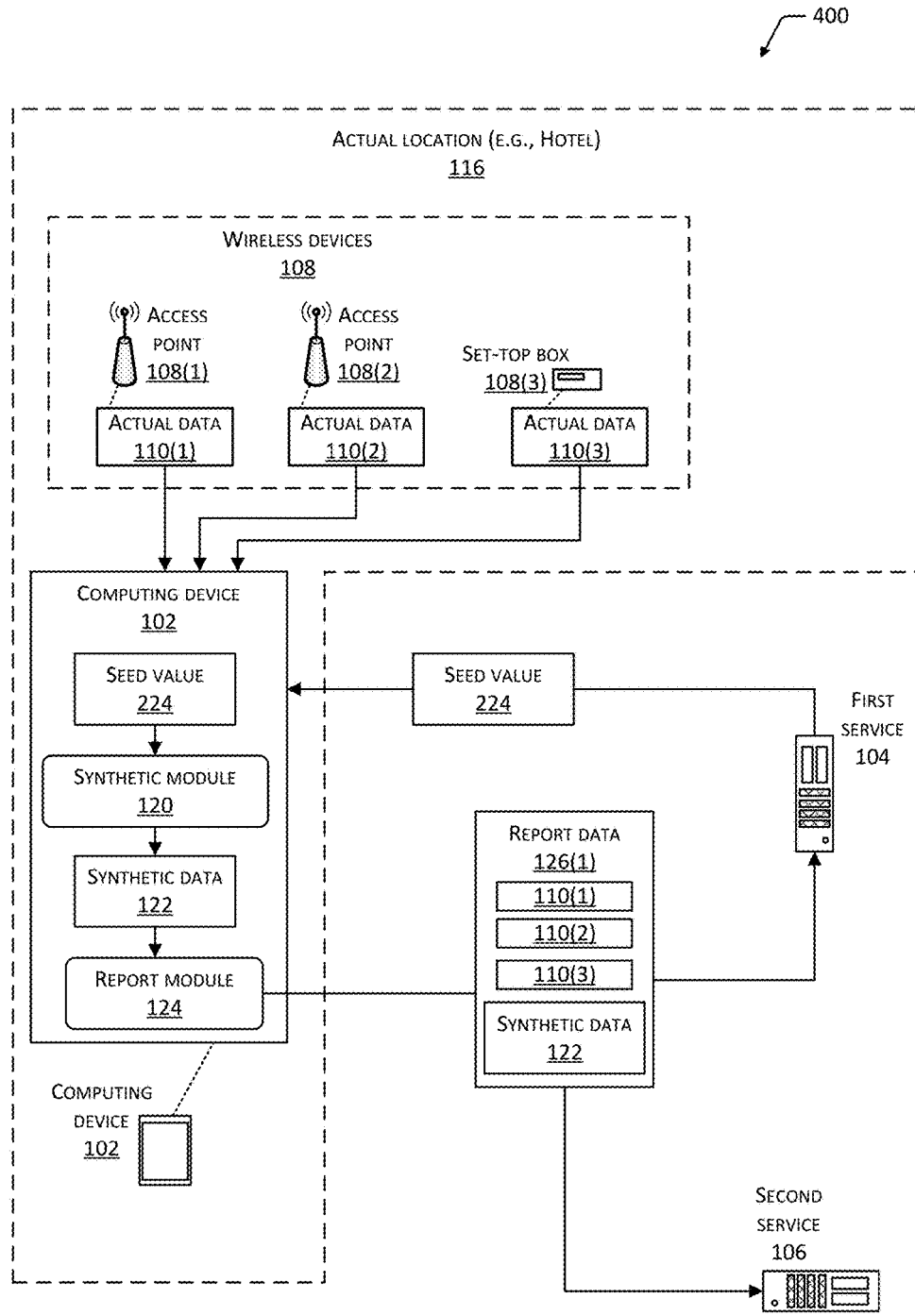
FIG. 4 is an illustrative system generating synthetic data based on a seed value provided by a service.

FIG. 4 is an illustrative system 400 generating synthetic data 122 based on the seed value 224 provided by the first service 104. In FIG. 4, the computing device 102, the access points 108(1) and 108(2), and the set-top box 108(3) are located at the actual location 116. For example, the actual location 116 may comprise a hotel. The computing device 102 acquires actual data 110 from the various wireless devices 108. The access point 108(1) transmits the actual data 110(1) to the computing device 102, the access point 108(2) transmits the actual data 110(2) to the computing device 102, and the set-top box 108(3) transmits the actual data 110(3) to the computing device 102.

The first service 104 generates the seed value 224 and provides the seed value 224 to the computing device 102. The first service 104 may include the pseudorandom number generator module (not shown) configured to generate the seed value 224. The first service 104 may be associated with a business entity that is also associated with the computing device 102. For example, a particular business entity may manage the first service 104, and the particular business entity may manufacture the computing device 102.

The synthetic module 120 generates the synthetic data 122 using the seed value 224 as an input. The seed value 224 may comprise data that is used to initialize the synthetic module 120 to generate the synthetic data 122.

The report module 124 may generate the report data 126 by aggregating the acquired actual data 110(1), 110(2), and 110(3) that was acquired at the actual location 116 and the generated synthetic data 122. In FIG. 4, the report data 126 includes the actual data 110(1), 110(2), and 110(3) and the generated synthetic data 122.

As discussed above, the first service 104 provides the seed value 224 to the computing device 102. In FIG. 4, the first service 104 stores the seed value 224. Because the first service 104 includes the seed value 224, the first service 104 may use the seed value 224 to determine which portion of the report data 126 includes the synthetic data 122. Accordingly, the first service 104 may remove the synthetic data 122 from the report data 126 such that the first service 104 may use the actual data 110 portion of the report data 126 to determine the actual location 116 of the computing device 102.

Since the second service 106 does not store the seed value 224, the second service 106 is unable to determine the actual location 116 of the computing device 102. Accordingly, users of the computing device 102 or service providers of the computing device 102 may prevent the second service 106 from obtaining accurate location information of the computing device 102.

In FIG. 4, the computing device 102 includes the synthetic module 120, and the first service 104 provides the seed value 224 to the computing device 102. In other implementations, one or more of the wireless devices 108(1), 108(2), and 108(3) may include the synthetic module 120. In these implementations, the first service 104 may provide the seed value 224 to the one or more of the wireless devices 108(1), 108(2), and 108(3) that include the synthetic module 120. The wireless device 108 may generate the synthetic data 122, and the wireless device 108 may provide the synthetic data 122 to the computing device 102 using the network described above.

In some implementations, other computing devices (not shown), such as a server, may be configured to generate and provide the seed value 224 to the wireless device 108. The wireless device 108 may then generate the synthetic data 122, and the wireless device 108 may provide the synthetic data 122 to the computing device 102 using the network described above.

Figure 5:
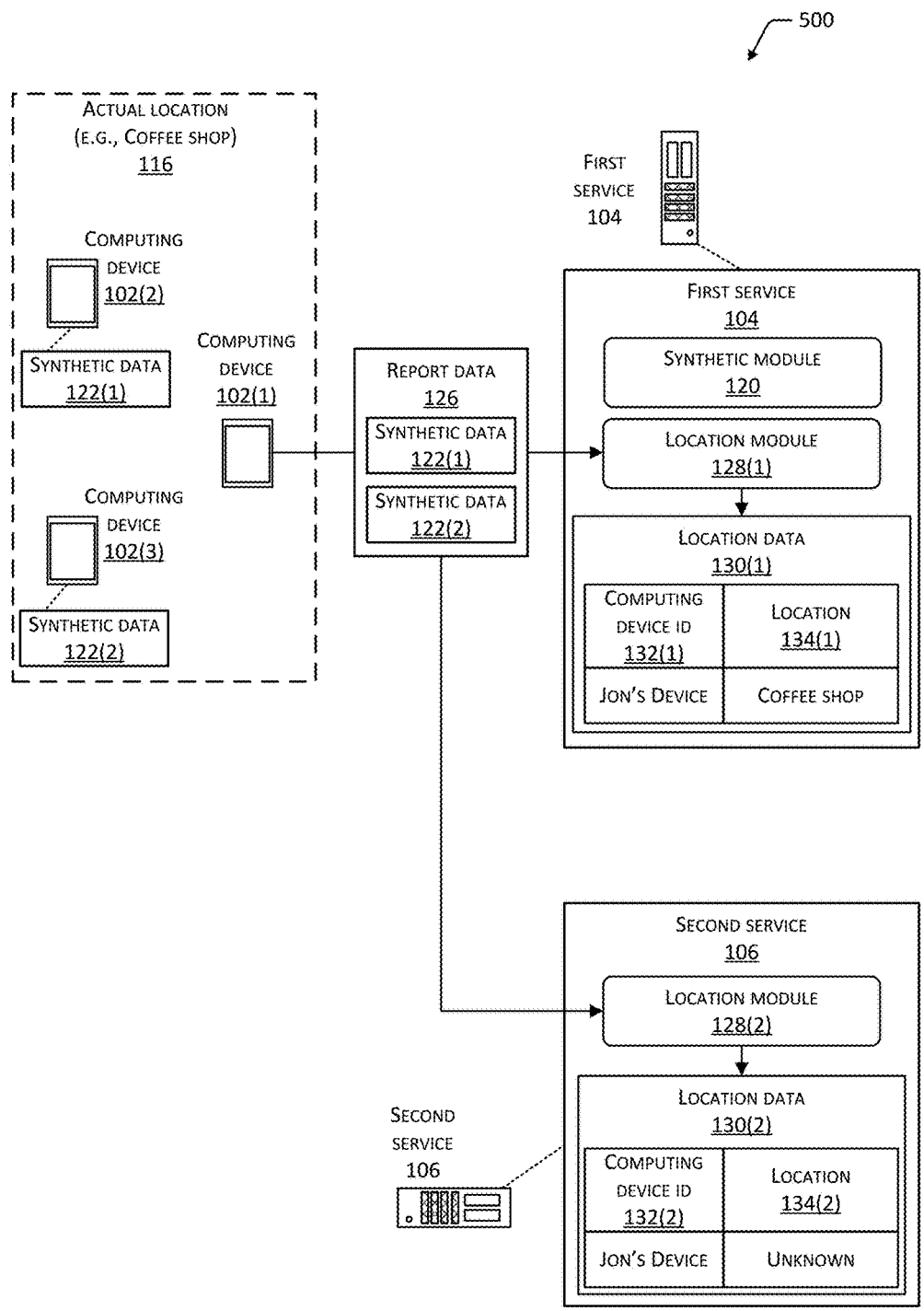
FIG. 5 is an illustrative system providing report data that includes synthetic data acquired from other computing devices.

FIG. 5 is an illustrative system 500 generating report data 126 having synthetic data 122 acquired from other computing devices 102. In FIG. 5, the computing devices 102(1), 102(2), and 102(3) are located at the actual location 116. The computing device 102(1) acquires the synthetic data 122(1) from the computing device 102(2), and the synthetic data 122(2) from the computing device 102(3).

The first service 104 may be associated with a business entity that is also associated with the computing devices 102(1), 102(2) and 102(3). For example, a particular business entity may manage the first service 104, and the particular business entity may manufacture the computing devices 102(1), 102(2) and 102(3).

The synthetic module 120 may generate the synthetic data 122(1) and 122(2) and provide the synthetic data 122(1) and 122(2) to the computing devices 102(2) and 102(3), respectively. In some implementations, the computing device 102(2) generates the synthetic data 122(1), and the computing device 102(3) generates the synthetic data 122(2).

The computing device 102(1) may generate the report data 126 by aggregating the acquired synthetic data 122(1) and 122(2) from the actual location 116. In FIG. 5, the report data 126 includes the synthetic data 122(1) and 122(2).

As discussed above, the first service 104 may generate the synthetic data 122(1) and 122(2). Once generated, the first service 104 may store the synthetic data 122(1) and 122(2). Since the first service 104 stores the synthetic data 122(1) and 122(2), the first service 104 may determine the actual location 116 of the computing device 102(1). The first service 104 may include the location data store 226 (not shown). The location data store 226 may include different synthetic data 122 that is associated with different locations. The first service 104 may compare the report data 126 with information from the location data store 226 to determine the actual location 116 of the computing device 102.

The second service 106 may be unable to determine which data of the report data 126 includes the synthetic data 122(1) and 122(2). Accordingly, the second service 106 is unable to determine the actual location 116 of the computing device 102(1).

Figure 6:
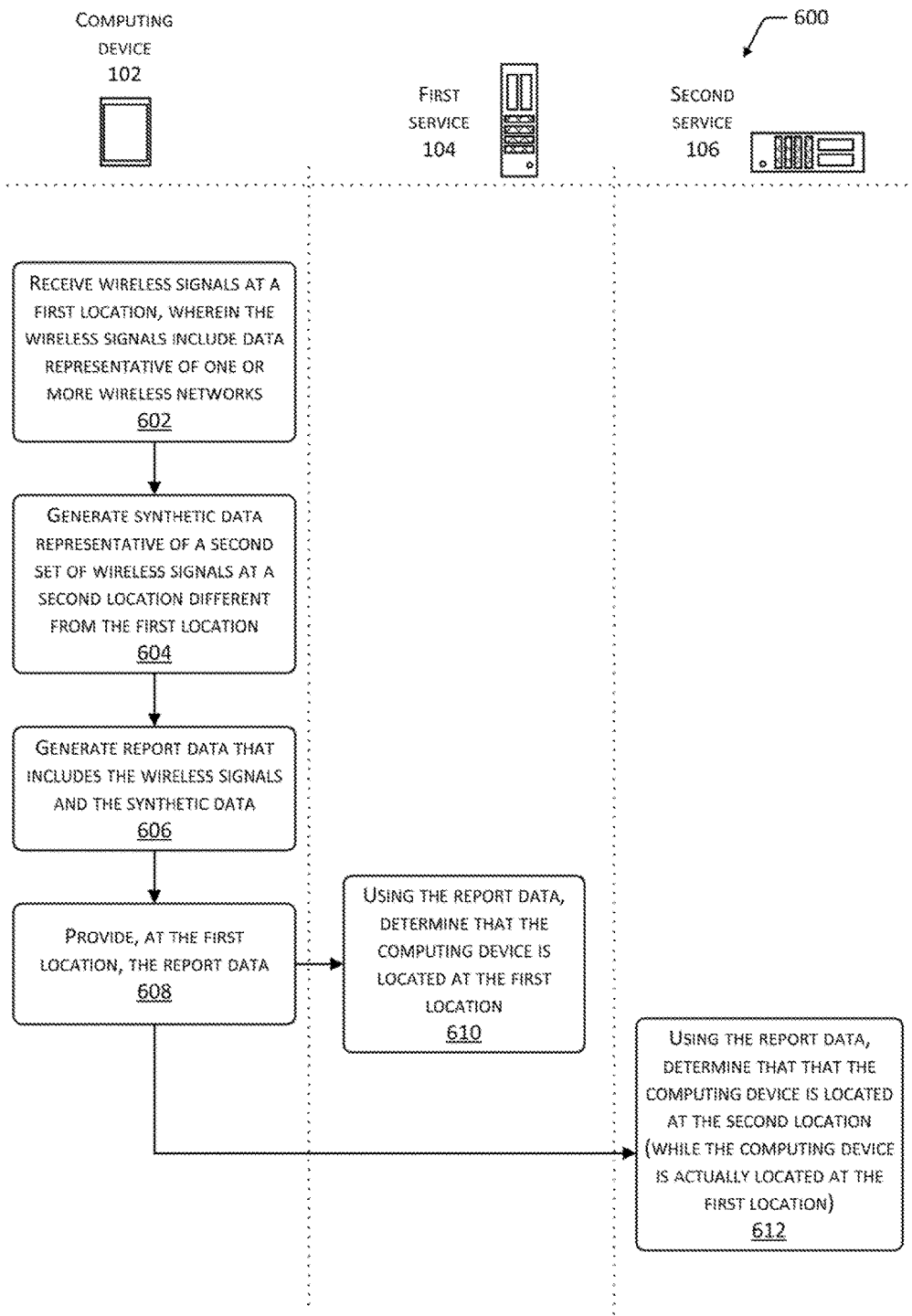
FIG. 6 is a flow diagram illustrating a process of obfuscating location by providing synthetic data to a service configured to determine that the computing device is located at a different location than the actual location of the computing device.

FIG. 6 is a flow diagram illustrating a process 600 for providing report data 126 that includes synthetic data 122 acquired from other computing devices 102. Although the process 600 is described with reference to the flowchart illustrated in FIG. 6, many other methods performing the acts associated with the process 600 may be used. For example, the order of the steps may be changed, some of the steps described may be optional, and additional steps may be included.

At 602, the computing device 102 receives wireless signals at a first location (e.g., the actual location 116). The actual data 110 may comprise the received wireless signals at the first location. The wireless signals may include beacon frames representative of one or more wireless networks.

At 604, the computing device 102 generates the synthetic data 122 representative of a second set of wireless signals at a second location (e.g., the other location 118) different from the first location. In some implementations, rather than generating the synthetic data 122, the computing device 102 may receive the synthetic data 122 from other computing devices 102, the first service 104, the wireless device 108, and so forth.

At 606, the computing device 102 generates the report data 126 that includes the wireless signals and the synthetic data 122. In one example, the report module 124 generates the report data 126 by aggregating the actual data 110 and the synthetic data 122 that are acquired from wireless devices 108. The report module 124 may be configured to remove or filter information when generating the report data 126. For example, the computing device 102 may acquire a first SSID from a first wireless device 108(1) and a second SSID from a second wireless device 108(2). When generating report data 126, the report module 124 may be configured to filter the first SSID from the report data 126, such that the first SSID is omitted from the report data 126. In one example, the report module 124 filters the first SSID based on a determination that the first SSID has a larger power level when compared to the second SSID. In another example, the report module 124 filters the first SSID based on a determination that the computing device 102 is connected to the first SSID.

At 608, the computing device 102 provides, at the first location, the report data 126 to the first service 104 and the second service 106. At 610, the first service 104, using the report data 126, determines that the computing device 102 is located at the first location. In one example, the first service 104 compares the report data 126 to information stored in the location data store 226 to determine whether the report data 126 matches any of the stored information in the location data store 226 to determine the location of the computing device 102.

At 612, the second service 106, using the report data 126, determines that that the computing device 102 is located at the second location. However, the computing device 102 is actually located at the first location. The second service 106 may determine that the computing device 102 is located at the second location because the synthetic data 122 may include information that is associated with devices located at the second location.

Figure 7:
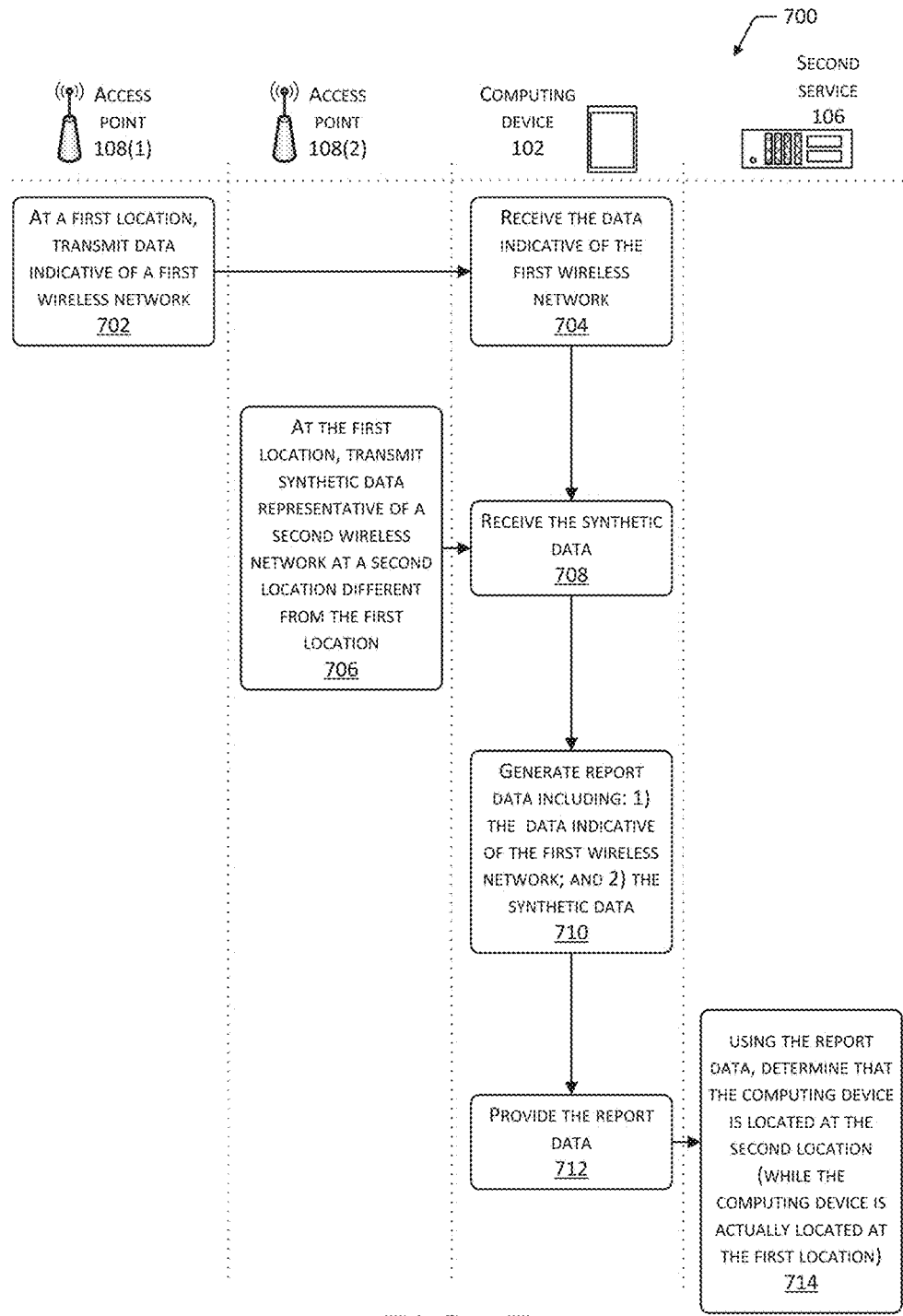
FIG. 7 is a flow diagram illustrating a process of generating report data based on synthetic data received from a wireless device.

FIG. 7 is a flow diagram illustrating a process 700 of obfuscating location by providing report data 126 to the first service 104 and providing synthetic data 122 to the second service 106. Although the process 700 is described with reference to the flowchart illustrated in FIG. 7, many other methods performing the acts associated with the process 700 may be used. For example, the order of the steps may be changed, some of the steps described may be optional, and additional steps may be included.

At 702, the access point 108(1), at a first location, transmits data indicative of a first wireless network. In one example, the access point 108(1) transmits the actual data 110(1) to the computing device 102 using the network described above. At 704, the computing device 102 receives the data indicative of the first wireless network.

At 706, the access point 108(2), at the first location, transmits the synthetic data 122 representative of a second wireless network at a second location different from the first location. In one example, the access point 108(2) transmits the synthetic data 122 that includes the actual data 110(3) and 110(4) to the computing device 102 using the network described above. At 708, the computing device 102 receives the synthetic data 122.

At 710, the computing device 102 generates the report data 126 including: 1) the data indicative of the first wireless network; and 2) the synthetic data 122. In one example, the report module 124 generates the report data 126 by aggregating the actual data 110 and the synthetic data 122 that are acquired from wireless devices 108.

At 712, the computing device 102 provides the report data 126 to the second service 106. At 714, using the report data 126, the second service 106 determines that that the computing device 102 is located at the second location when the computing device 102 is actually located at the first location. The second service 106 may determine that the computing device 102 is located at the second location because the synthetic data 122 may include information that is associated with devices located at the second location.

In some implementations, the first service 104 is configured to generate the synthetic data 122 and provide the synthetic data 122 to the access point 108(2). Thereafter, the first service 104 may be configured to request and receive the report data 126 from the computing device 102. The report data 126 may include the synthetic data 122 that was generated by the first service 104. Once the first service 104 receives the report data 126 from the computing device 102, the first service 104 may filter the synthetic data 122 from the report data 126. By filtering the synthetic data 122 from the report data 126, the first service 104 may use the actual data 110 to determine the actual location 116 of the computing device 102.

Figure 8:
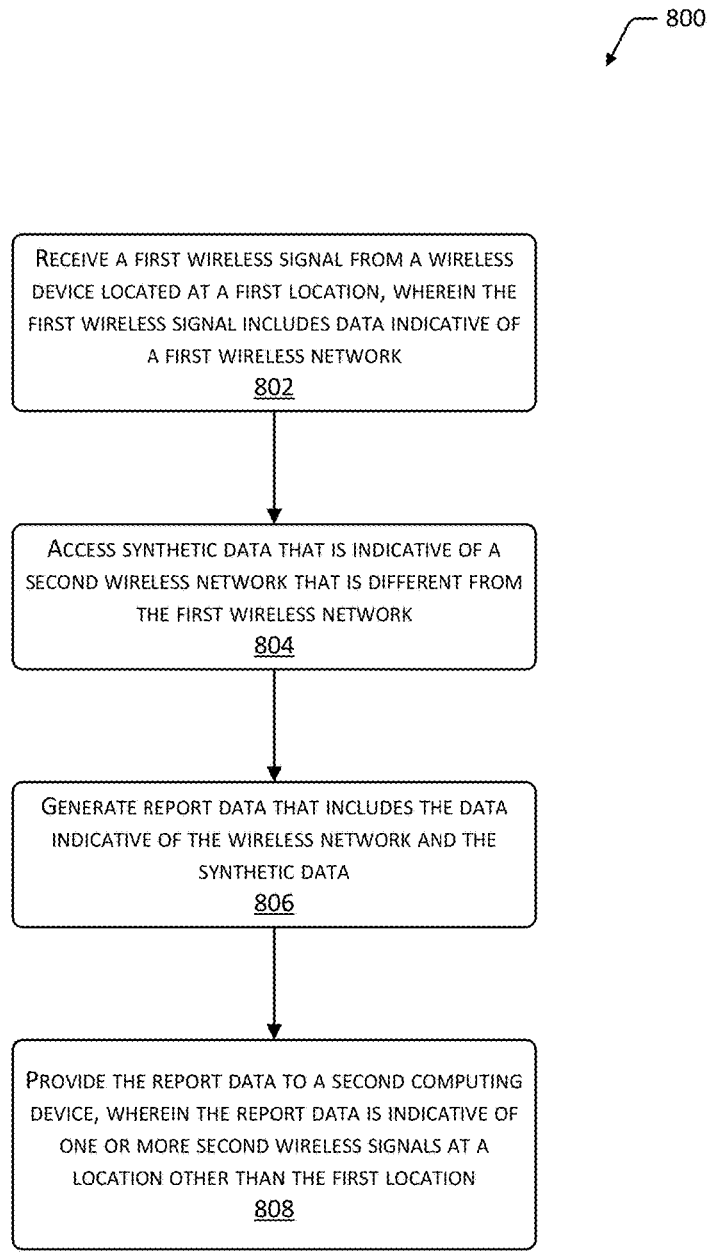
FIG. 8 is a flow diagram illustrating a process of providing report data indicative of wireless signals at a location other than the location of the computing device.

FIG. 8 is a flow diagram illustrating a process 800 of preventing the second service 106 from determining a location of the computing device 102 based on synthetic data 122. Although the process 800 is described with reference to the flowchart illustrated in FIG. 8, many other methods performing the acts associated with the process 800 may be used. For example, the order of the steps may be changed, some of the steps described may be optional, and additional steps may be included.

At 802, the computing device 102 receives a first wireless signal from a wireless device 108 located at a first location. The first wireless signal includes data indicative of a first wireless network. For example, the first wireless signal may include the actual data 110 which includes an SSID or BSSID. The SSID and the BSSID may be simulated. That is, the SSID and the BSSID may be fabricated or may represent imaginary information. In one example, the first service 104 includes a data store that includes a plurality of different simulated wireless networks. When the first service 104 generates the synthetic data 122, the first service 104 may select one or more simulated wireless networks from the data store.

At 804, the computing device 102 accesses the synthetic data 122 that is indicative of a second wireless network, which is different from the first wireless network. The synthetic data 122 may be provided by one or more wireless devices 108. In some implementations, the computing device 102 may generate the synthetic data 122.

At 806, the computing device 102 generates the report data 126 that includes the data indicative of the wireless network and the synthetic data 122. In some implementations, the computing device 102 generates second synthetic data 122 indicative of a third wireless network that is different from the first and second wireless networks. The second synthetic data 122 may be generated based on previously acquired wireless signals that were acquired at a location. The report data 126 generated at 806 may include the second synthetic data 122. The computing device 102 may be configured to transmit the second synthetic data 122.

At 808, the computing device 102 provides the report data 126 to a second computing device 102 (e.g., the second service 106). The report data 126 may be indicative of one or more second wireless signals at a location other than the first location. The second service 106 may use the report data 126 to attempt to determine the location of the computing device 102.

The computing device 102 may generate the report data 126 using the seed value 224. The first service 104 may generate and provide the seed value 224 to the computing device 102. The computing device 102 may include the pseudorandom number generator module that may use the seed value 224 as an input to generate the synthetic data 122.

In some implementations, the wireless device 108 is configured to provide the synthetic data 122 to the computing device 102. The wireless device 108 may be configured to store sets of wireless signals associated with locations. For example, a first set of wireless signals may include three SSIDs that may be acquired at a particular shopping mall, and a second set of wireless signals may include three other SSIDs that may be acquired at a particular gas station. The wireless device 108 may be configured to cycle through and transmit the different sets of wireless signals. Continuing with the example, the wireless device 108 may transmit the first set of wireless signals (i.e., the shopping mall SSIDs) for 60 seconds, and then transmit the second set of wireless signals (i.e., the gas stations SSIDs) for 60 seconds.

The synthetic data 122 may be provided by a device that may or may not operate in an access point mode. For example, a smartphone that is proximate to the computing device 102 may transmit actual data 110 to the computing device 102. In this example, the smartphone may not operate as in access point mode.

The synthetic data 122 that is transmitted to the computing device 102 may change. For example, for a first minute the wireless device 108 may transmit first synthetic data 122, and for a second minute may transmit second, different synthetic data 122.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

Embodiments may be provided as a computer program product including a non-transitory computer readable storage medium having stored thereon instructions (in compressed or uncompressed form) that may be used to program a computer (or other electronic device) to perform processes or methods described herein. The computer readable storage medium can be any one of an electronic storage medium, a magnetic storage medium, an optical storage medium, a quantum storage medium, and so forth. For example, the computer readable storage media may include, but is not limited to, hard drives, floppy diskettes, optical disks, read-only memories ("ROMs"), random access memories ("RAMs"), erasable programmable read only memories ("EPROMs"), electrically erasable programmable read-only memories ("EEPROMs"), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art, and it is intended that the present disclosure encompass such changes and modifications that fall within the scope of the appended claims.

What is claimed is:

1. A system comprising:
   a server configured to:
      generate synthetic data, the synthetic data generated to obfuscate a first location;
   an access point at the first location configured to transmit:
      a first set of wireless signals including a first service set identifier ("SSID"), and
      the synthetic data representative of a second set of wireless signals including a second SSID at a second location different from the first location;
   a computing device at the first location and in communication with the access point, wherein the computing device is configured to:
      receive the first set of wireless signals and the synthetic data from the access point; and
      generate report data that includes the first SSID and the synthetic data; and
   a second server at a third location and in communication with the computing device, wherein the second server is configured to:
      receive the report data from the computing device; and
      using the report data, determine that the computing device is located at a fourth location while the computing device is located at the first location, wherein the fourth location is different from the first location.

2. The system of claim 1, wherein the computing device is further configured to:
   generate second synthetic data representative of a third set of wireless signals including a third SSID at a fifth location, wherein the report data includes the first SSID, the second SSID, the synthetic data, and the second synthetic data; and
   transmit the second synthetic data.

3. The system of claim 2, wherein the second synthetic data is generated based on previously acquired wireless signals that were acquired at the fifth location.

4. The system of claim 1, wherein the server is in communication with the access point and the computing device, and wherein the server is further configured to:
   provide the synthetic data to the computing device;
   receive the report data from the computing device; and
   filter the synthetic data from the report data to determine that the computing device was located at the first location.

5. A method comprising:
   receiving a first wireless signal from a first wireless device located at a first location, wherein the first wireless signal includes data indicative of a first wireless network;
   identifying synthetic data, wherein the synthetic data is generated to obfuscate the first location;
   accessing the synthetic data that is indicative of a second wireless network that is different from the first wireless network; and
   generating report data that includes the data indicative of the first wireless network and the synthetic data, wherein the report data is indicative of one or more second wireless signals at a location other than the first location.

6. The method of claim 5, further comprising:
   receiving the synthetic data from a first computing device, wherein:
      the first computing device is configured to generate the synthetic data using a seed value; and
      the seed value is provided to the first computing device by a second computing device.

7. The method of claim 5, further comprising:
   receiving a seed value from a computing device, wherein the seed value is used to initialize a pseudorandom number generator;
   generating the synthetic data using the pseudorandom number generator; and
   transmitting the synthetic data.

8. The method of claim 5, wherein the synthetic data is received from a computing device that includes sets of wireless signals associated with other locations.

9. The method of claim 5, wherein:
   the synthetic data is provided by a computing device;
   the report data is received by the computing device; and
   the computing device authenticates that a second computing device was located at the first location using the synthetic data.

10. The method of claim 5, wherein:
    the synthetic data is generated using a seed value;
    the synthetic data is generated by a first computing device;
    the first computing device receives the report data from a second computing device; and
    the first computing device determines, using the seed value, that the second computing device is located at the first location.

11. The method of claim 5, further comprising:
    providing the report data to a first computing device configured to determine that a second computing device was located at the first location by comparing the data indicative of the first wireless network with a data store storing a plurality of different data indicative of different wireless networks that are associated with different locations.

12. The method of claim 5, further comprising:
accessing second synthetic data that is indicative of a third wireless network that is different from the first wireless network and the second wireless network;
wherein:
the synthetic data is accessed during a first time window; and
the second synthetic data is accessed during a second time window that is different from the first time window.

13. The method of claim 5, wherein the second wireless network is a simulated wireless network that is selected from a data store that includes a plurality of different simulated wireless networks.

14. The method of claim 5, further comprising:
determining that a first computing device is located at the location other than the first location based on the second wireless network being located at the location other than the first location.

15. The method of claim 5, wherein the synthetic data further comprises data representative of a second wireless device that transmits the synthetic data to a first computing device, wherein the data representative of the second wireless device indicates that the second wireless device is located at the location other than the first location.

16. The method of claim 5, further comprising:
generating second synthetic data representative of a third wireless network that is different from the first wireless network and the second wireless network, wherein the report data includes the data indicative of the first wireless network, the synthetic data, and the second synthetic data.

17. A computing device comprising:
a communication interface;
a memory storing computer-executable instructions; and
a hardware processor in communication with the communication interface and the memory, wherein the hardware processor is configured to execute the computer-executable instructions to:
use the communication interface to receive:
a first wireless signal from a first wireless device located at a first location, wherein the first wireless signal includes data representative of the first wireless device;
a second wireless signal from a second wireless device located at the first location, wherein the second wireless signal includes synthetic data representative of a third wireless device that is different from the first wireless device and the second wireless device, wherein the synthetic data is generated using a seed value, and wherein the synthetic data is generated to obfuscate the first location;
generate report data that includes the data representative of the first wireless signal and data representative of the second wireless signal, wherein the report data is indicative of one or more fourth wireless devices at a location other than the first location; and
provide the report data to a second computing device, wherein the second computing device determines, using the report data, that the computing device is located at the location other than the first location.

18. The computing device of claim 17, wherein:
the second wireless signal includes at least one of a simulated basic service set identification ("BSSID") or a simulated service set identifier ("SSID");
the second wireless device operates in an access point mode; and
the hardware processor is configured to execute the computer-executable instructions to receive the second wireless signal when the computing device is located within a distance of the second wireless device.

19. The computing device of claim 17, wherein the hardware processor is further configured to execute the computer-executable instructions to provide the report data to a third computing device configured to determine that the computing device was located at the first location based on the seed value that is used to generate the synthetic data.

20. The computing device of claim 17, wherein the second wireless device is configured to:
transmit, at a first time, the second wireless signal at a first power level; and
transmit, at a second time, a third wireless signal at a second power level, wherein the third wireless signal includes data representative of the second wireless device.

* * * * *